United States Patent
Yoshimoto

(10) Patent No.: US 6,539,689 B1
(45) Date of Patent: Apr. 1, 2003

(54) BAG MOUTH SEALING DEVICE

(75) Inventor: Hiroshi Yoshimoto, Hiroshima (JP)

(73) Assignee: Furukawa Mfg. Co., Ltd. (JP)

( * ) Notice: Subject to any disclaimer, the term of this patent is extended or adjusted under 35 U.S.C. 154(b) by 77 days.

(21) Appl. No.: 09/806,186

(22) PCT Filed: Jul. 31, 2000

(86) PCT No.: PCT/JP00/05158
§ 371 (c)(1),
(2), (4) Date: May 8, 2001

(87) PCT Pub. No.: WO01/08979
PCT Pub. Date: Feb. 8, 2001

(30) Foreign Application Priority Data

Aug. 2, 1999 (JP) .......................... 11-218243

(51) Int. Cl.⁷ .......................... B65B 31/02; B65B 57/10
(52) U.S. Cl. ................... 53/434; 53/64; 53/512
(58) Field of Search ................. 53/434, 512, 64, 53/450, 550

(56) References Cited

U.S. PATENT DOCUMENTS

| | | | |
|---|---|---|---|
| 4,726,168 A | 2/1988 | Seko | 53/450 |
| 4,754,596 A * | 7/1988 | Yasumune et al. | 53/512 |
| 4,779,398 A * | 10/1988 | Glandon et al. | 53/434 |
| 4,903,459 A * | 2/1990 | Okinaka | 53/512 |
| 4,909,018 A | 3/1990 | Yamamoto | 53/450 |
| 5,062,252 A * | 11/1991 | Kupcikevicius | 53/434 |
| 5,209,043 A * | 5/1993 | Kupcikevicius | 53/512 |
| 5,689,942 A | 11/1997 | Suga | 53/550 |

FOREIGN PATENT DOCUMENTS

| | | |
|---|---|---|
| DE | 198 13 311 A1 | 10/1998 |
| EP | 0 230 137 A1 | 7/1987 |
| EP | 0 836 996 A1 | 4/1998 |
| JP | 10081310 A | 3/1998 |
| JP | 10316231 A | 12/1998 |

* cited by examiner

*Primary Examiner*—John Sipos
(74) *Attorney, Agent, or Firm*—Mark Kusner; Michael A. Jaffe

(57) ABSTRACT

Means to sequentially transfer packaged bodies (30) carried by a conveyor (32) onto surface plates (40) rotated at equal intervals along a circular route (41) and vacuum-package the packaged bodies (30) in a vacuum chamber formed with cover materials covering the surface plates (40), wherein the feed pitch of each surface plate (40) is input into a controller (58) with pulses from an encoder (56), and a pitch between the front end sides of packaged matter (18) inside the packaged bodies is detected by an optical sensor (59) and input to the controller (58) so as to control the speed of an adjustment conveyor (35) according to a pitch displacement of the packaged matter (18) relative to the pitch between the surface plates (40).

4 Claims, 6 Drawing Sheets

BAG MOUTH SEALING DEVICE

TECHNICAL FIELD

The present invention relates to a device connecting a bag forming-filling-sealing-packaging machine which produces a pull-out tube by passing a belt-shaped film through tube-forming means, while touching packaged matter with each attachment mounted at equal intervals on a feed conveyor and feeding the packaged matter inside the film tube, and which also seals and cuts the above-mentioned film tube along either a front-end or back-end reference line of each packaged matter in the direction of travel of the film tube, and a rotary-type vacuum packaging machine which forms vacuum-packed bodies by sequentially carrying packaged bodies produced from the packaging machine to the inside of a plurality of vacuum chambers rotating along an endless track, more particularly to sealing means for a bag mouth provided in the device.

BACKGROUND ART

The above-mentioned bag forming-filling-sealing-packaging machine is given the capability of automatically loading foodstuff, for example, inside a bag, and transferring the same successively, so that by connecting a rotary-type vacuum packaging machine after the packaging machine, it is possible to efficiently vacuum pack a packaged body produced by the bag forming-filling-sealing-packaging machine. In this case, a packaged body is not completely sealed by the bag forming-filling-sealing-packaging machine, a bag mouth being sealed after the air inside the bag is removed by the vacuum packaging machine. In heretofore Japanese Patent Application Laid-open No. 10-81310, there is disclosed a device which is capable of detecting, with a sensor, the bag mouth of each packaged body successively produced and transferred via a conveyor from a bag forming-filling-sealing-packaging machine, and, in addition, through such detection, of confirming a precise distance to a vacuum chamber, controlling transfer speed of a bag, and positioning the bag mouth precisely along an edge of a sealing mount in a vacuum chamber. However, there has been a problem that when transferring a packaged body from a carry-out conveyor to the vacuum chamber, the packaged body is transferred by dropping a predetermined drop, so that positioning every bag mouth exactly along the sealing mount is extremely difficult, entailing that a hot sealing mark is formed in a skewed condition at a bag opening edge, or the sealing mark being formed either deeply or shallowly relative to a bag opening edge, causing reduction in commercial value of a finished product.

DISCLOSURE OF THE INVENTION

To do away with the above-mentioned problem, the present invention provides a device for producing a pull-out tube by passing a belt-shaped film through tube-forming means, while touching a packaged matter with each attachment mounted at equal intervals on a feed conveyor and pushing the matter inside a film tube, and sealing and cutting the film tube along a back-end reference line of each packaged matter in a direction of travel of the film tube, and thereafter, carrying each packaged body onto a surface plate which moves at equal intervals and composes a part of a vacuum chamber, wherein the device comprises: an adjustable conveyor installed in front of a movement area of the surface plate; means for detecting the front end traveling pitch of each packaged matter, and means for detecting a traveling pitch of each surface plate; a device for detecting the displacement of a packaged matter front end relative to each surface plate pitch by way of comparison between detected values by these two means; means for controlling speed of the adjustable conveyor according to a signal sent out from the displacement detecting device such that the front end of the packaged body is positioned along a sealing mount of a surface plate; and a cutter installed inside the vacuum chamber so as to sever a bag mouth of the packaged body along the sealing mount.

Further, the present invention provides a device for producing a pull-out tube by passing a belt-shaped film through tube-forming means, while touching a packaged matter with each attachment mounted at equal intervals on a feed conveyor and pushing the matter inside the film tube, and sealing and cutting the film tube along a front-end reference line of each packaged matter in a direction of travel of the film tube, and thereafter, carrying each packaged body onto a surface plate which moves at equal intervals and composes a part of a vacuum chamber, wherein the device comprises: an adjustable conveyor installed in front of a movement area of the surface plate; means for detecting a back end traveling pitch of each packaged matter, and means for detecting a traveling pitch of each surface plate; a device for detecting a displacement of a packaged matter back end relative to each surface plate pitch by way of comparison between detected values by these two means; means for controlling the speed of the adjustable conveyor according to a signal output from the displacement detecting device such that the back end of the packaged body is positioned along the sealing mount on a surface plate; and a cutter installed inside the vacuum chamber so as to sever a bag mouth of the packaged body along the sealing mount.

Since either the front end or back end of packaged matter inside the packaged body transferred from the bag forming-filling-sealing-packaging machine as mentioned above is picked up by detecting means, the distance to the sealing mount of the surface plate is confirmed and speed of the packaged body is controlled by the adjustable conveyor, and the packaged body is transferred to the surface plate such that either the front end or back end of the packaged matter is contiguous to the sealing mount, and because a head space inside a bag can be made small and, in addition, an excess part of the bag mouth can be severed by a cutter along the sealing mount, the bag can be made free of any displacement and skewing along its mouth edge and in its sealed portion.

BEST MODE FOR CARRYING OUT THE INVENTION

Figure 2:
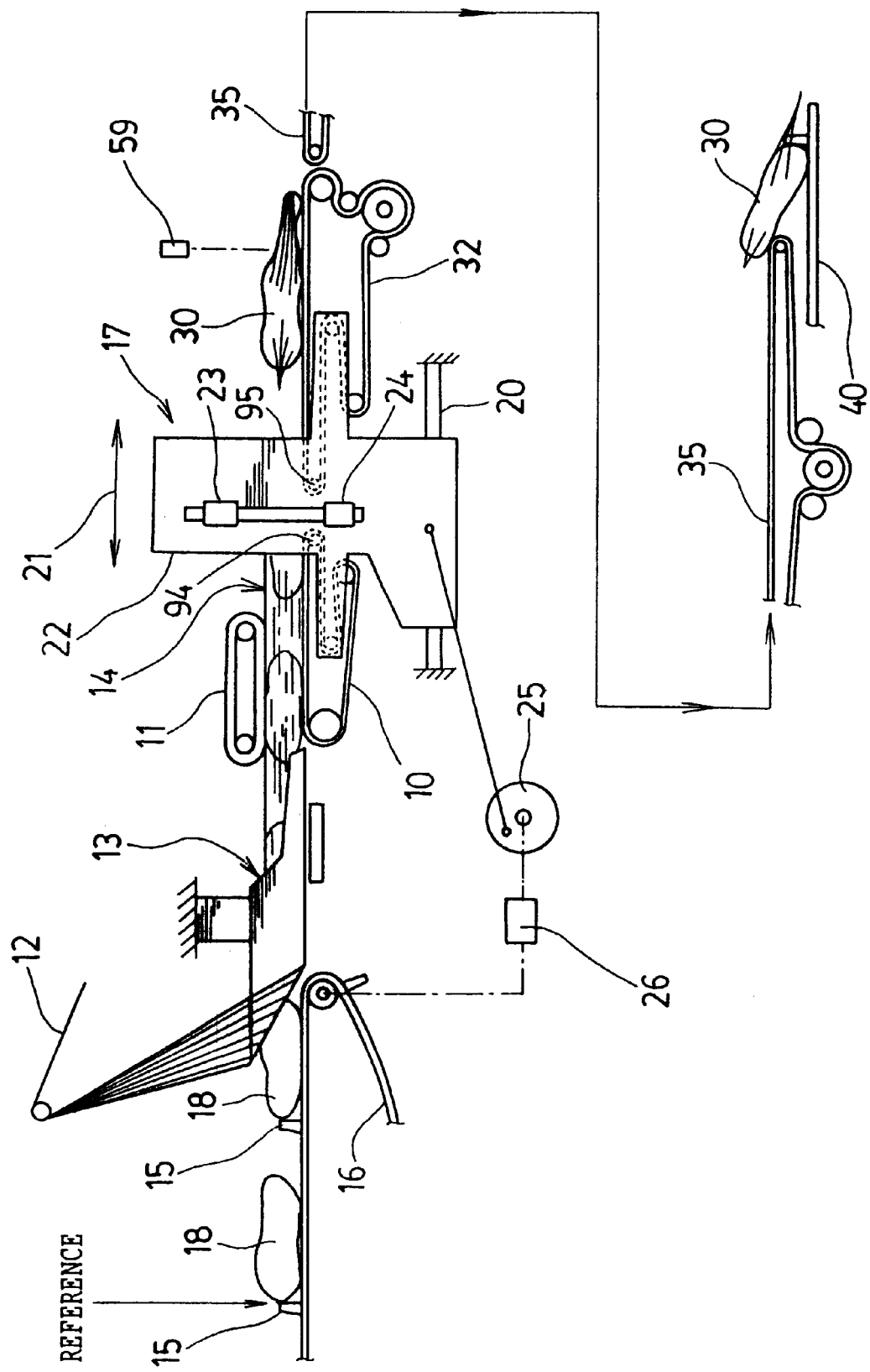
FIG. 2 is a side view of an entire of the device.

The bag forming-filling-sealing-packaging machine shown in FIG. 2 is constituted by tube-forming means 13 for pulling a belt-shaped film 12 via a lower side carrying conveyor 10 and an upper side pulling conveyor 11, and forming the film 12 into a tube 14; a feed conveyor 16, which is the entry point of the tube-forming means 13, and on which a plurality of attachments 15 are mounted at equal intervals; and a sealer 17 at the rear of the tube-forming means 13. Furthermore, in the same figure, because each attachment 15 touches the back end of the various irregularly-shaped packaged matter 18, and feeds same packaged matter 18 into the inside of a film tube 14, the pitch of the back-end reference line of each packaged matter 18 inside of a film tube 14 is at equal intervals, and the interval of the front end becomes an unequal interval.

Figure 3:
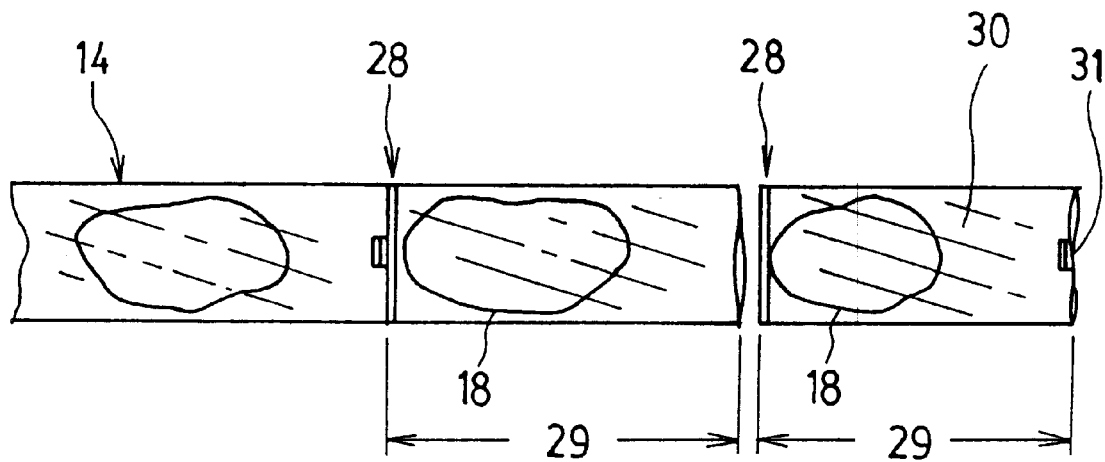
FIG. 3 is a plan view showing a bag-forming state.

The above-mentioned sealer 17 comprises a pair of top-bottom seal bars 23, 24 in a frame 22 which moves back and forth on a rail 20 as indicated by arrow 21, and since the operation of the above-mentioned feed conveyor 16 is synchronized by the drive motor 26 of a crank 25 which moves the above-mentioned frame 22 back and forth, the top-bottom seal bars 23, 24 make contact with the back end of each packaged matter 18, heat seal 28 is applied to a film tube 14 at equal intervals, and the film tube is cut into equal lengths 29, as in FIG. 3. Furthermore, in this case, the front end of a bag 30 is open in the direction of its travel except for a spot seal 31.

In FIG. 2, a packaged body 30 is carried out from the area of the sealer 17 by a carry-out conveyor 32. Since the above-mentioned carrying conveyor 10, and this carry-out conveyor 32 are respectively coupled to the seal frame 22 by opposing pulleys 94, 95, these two conveyors 10, 32 integrally expand and contract with the frame 22 as a result of the back and forth movement of the frame 22. And then, the packaged body 30 is fed out from the carry-out conveyor 32 onto a surface plate 40 via the adjustable conveyor 35.

Figure 1:
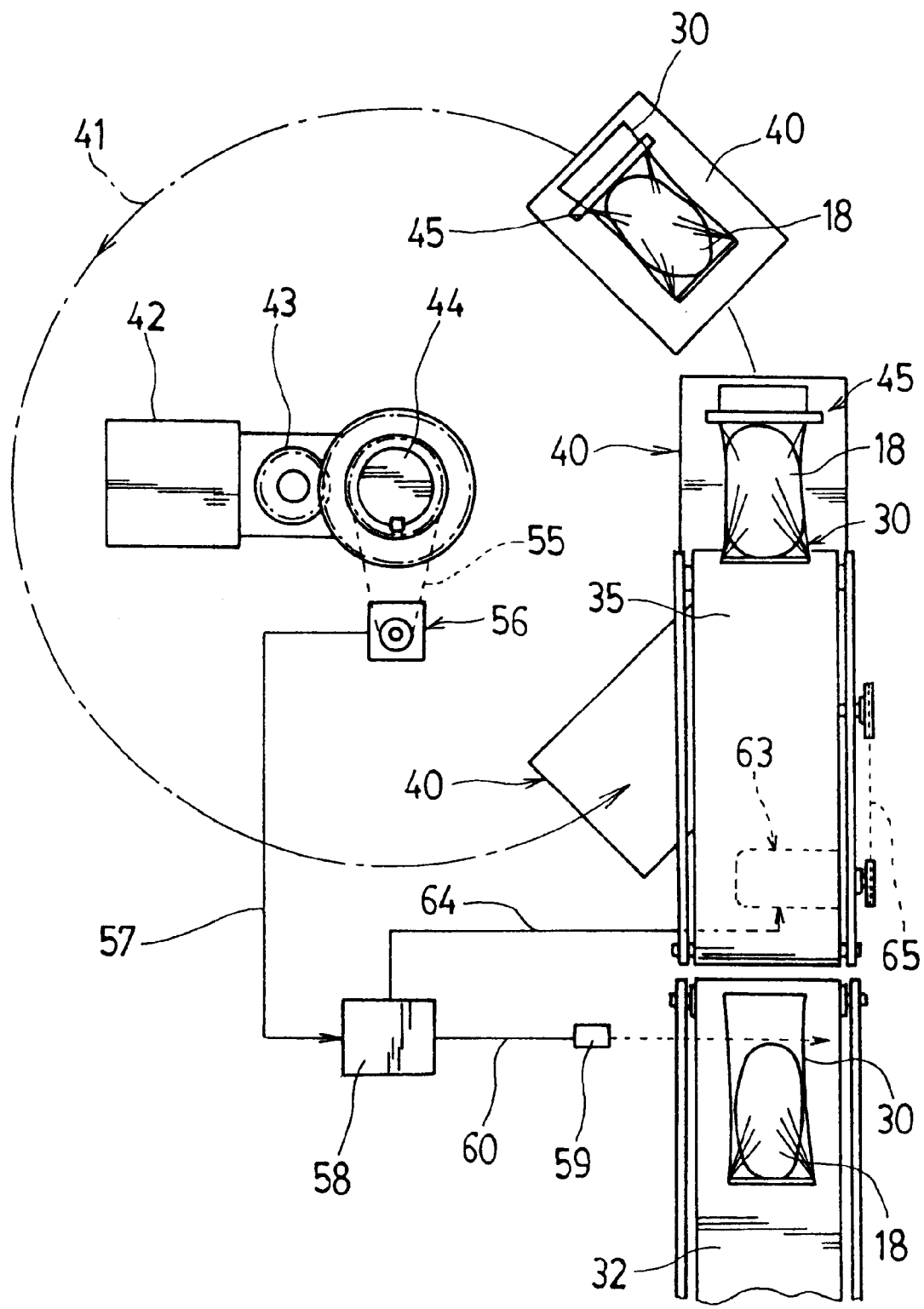
FIG. 1 is a plan view of essential parts of a device of an embodiment of the present invention.
Figure 4:
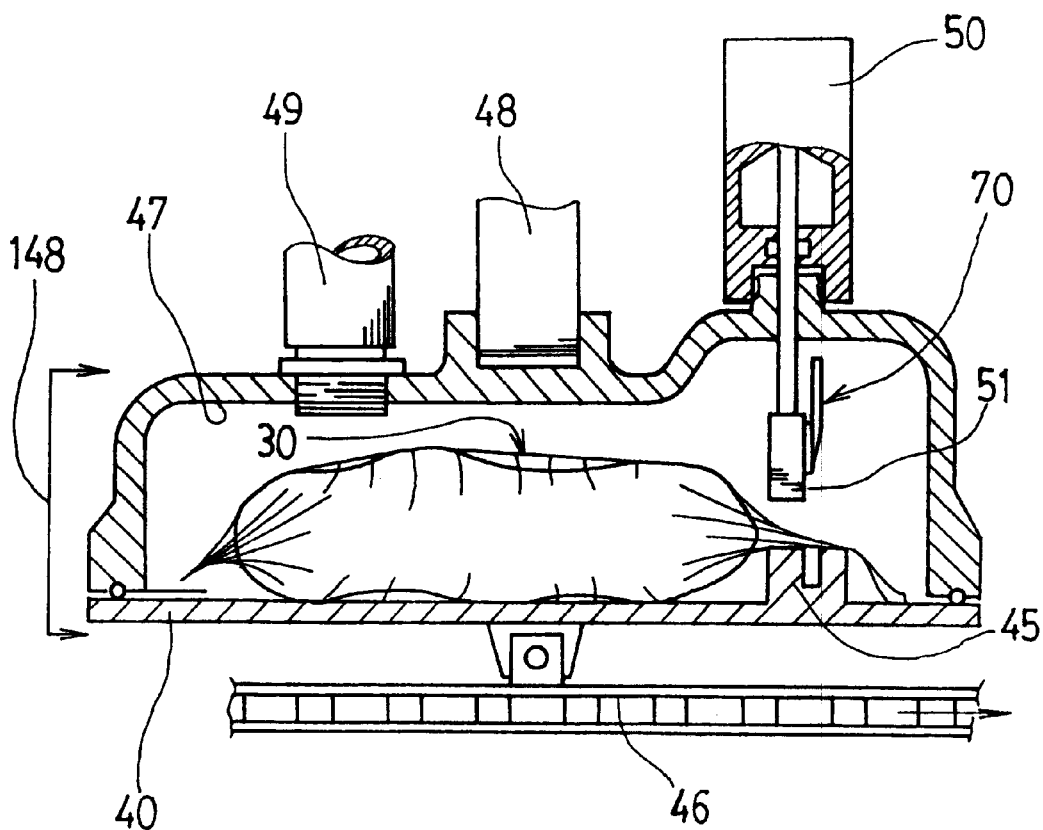
FIG. 4 is a cross-sectional view of a vacuum chamber.

The above-mentioned plurality of surface plates 40, seen from a plan view as in FIG. 1, rotate at equal intervals on a circular track 41. This rotating power is generated from a main shaft 44 driven by an output pinion 43 of a reduction gear connected to a motor 42, and, although omitted from the figure, eight surface plates 40 revolve around the main shaft 44. The surface plate 40 comprises a sealing mount 45 on the upper surface thereof, and the adjustable conveyor 35 successively transfers these packaged bodies such that a packaged body 30 uses the sealing mount 45 as a pillow. The above-mentioned surface plate 40, which is carried by a chain 46 as in FIG. 4, constitutes a vacuum chamber set 148 formed by a covering material 47 which is supported by an arm 48 and lowered from thereabove, and after forming a vacuum environment inside a chamber 148 through the use of a hose 49, a sealing bar 51 is lowered toward the sealing mount 45 by an actuator 50, and the bag mouth is sealed.

Figure 5:
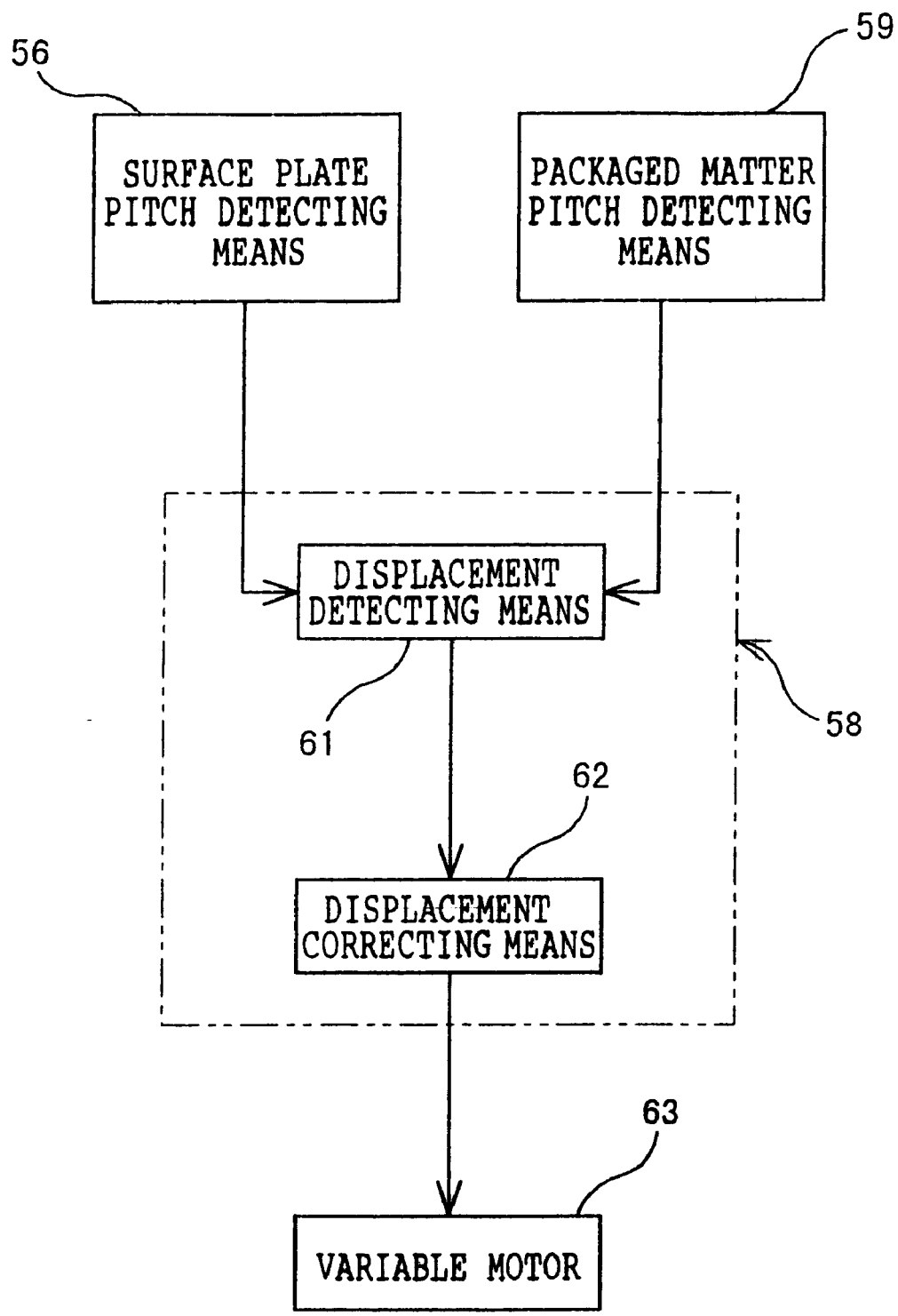
FIG. 5 is a block diagram of a controller.

In FIG. 1, an encoder 56 which is connected to the main shaft 44 by way of a belt 55, inputs, via pulses, the traveling pitch of each surface plate 40 to a controller 58 from a circuit 57. Consequently, this encoder 56 constitutes means for detecting the traveling pitch of the surface plate. Meanwhile, since a photoelectric sensor 59 disposed on the carry-out conveyor 32 inputs to the controller 58, from a circuit 60, the front-end pitch of packaged matter 18 in each packaged body 30, this sensor 59 constitutes means for detecting the front-end pitch of the packaged matter. And then, as shown in FIG. 5, a displacement detecting device 61 inside the controller 58 computes as a numerical value the displacement of the front end of the packaged matter inputted from packaged matter pitch detecting means 59 relative to the surface plate pitch inputted from the above-mentioned surface plate pitch detecting means 56, and also sends this numerical value to displacement correcting means 62, and controls rotational speed of a variable motor 63.

In other words, in accordance with the signal 64 output from controller 58 in FIG. 1, the variable motor 63 controls speed of the adjustable conveyor 35 via a chain 65, transfers the packaged body to the surface plate such that the front end of the packaged matter 18 makes contact with the sealing mount 45, and minimizes the head space inside the bag. Thereafter, the cutter 70 in FIG. 4 cuts and severs the bag mouth along the sealing mount 45.

Figure 6:
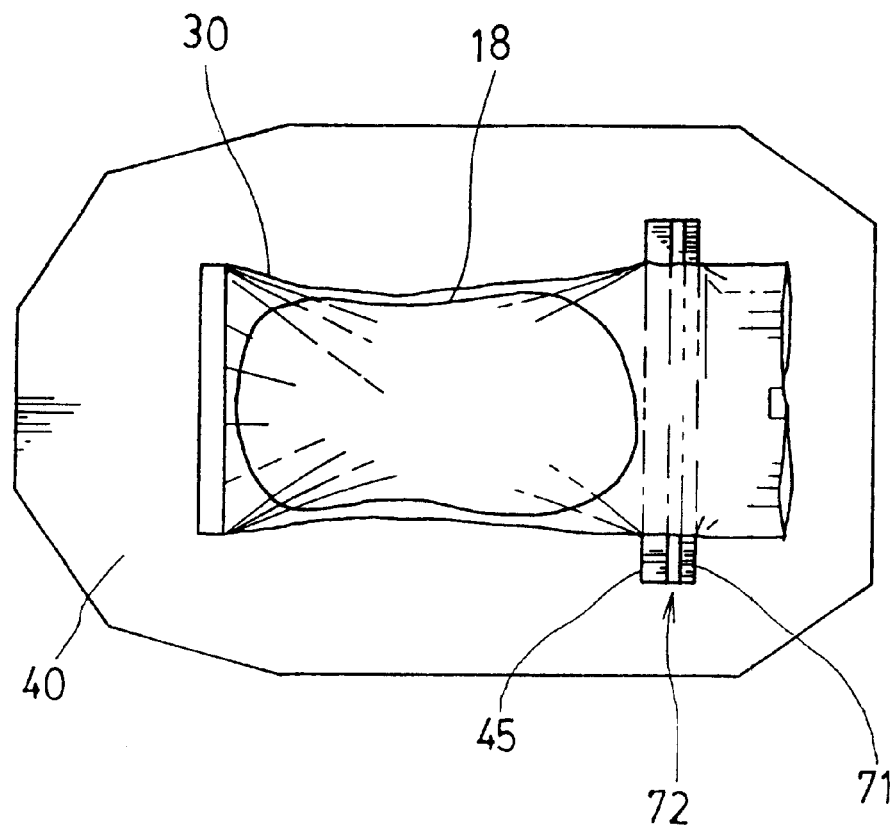
FIG. 6 is a plan view of a surface plate.
Figure 7:
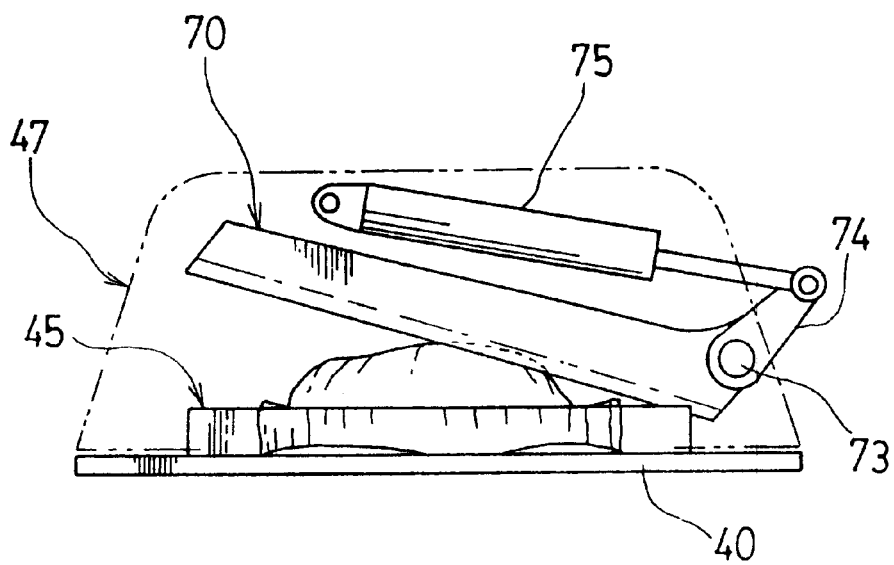
FIG. 7 is an illustration of a cutter in a vacuum chamber.
Figure 8:
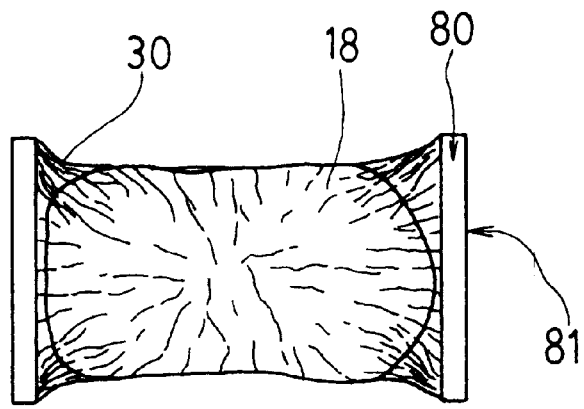
FIG. 8 is a plan view of a vacuum packaged body.

The above-mentioned cutter 70 is dropped inside a groove 72 formed between the sealing mount 45 and a wall 71 as shown in FIG. 6. As in FIG. 7, the cutter 70 is supported by a shaft 73 inside of the covering material 47 which is indicated by a virtual line, a lever 74 on the outside of the covering material 47 connected to the above-mentioned shaft 73 is operated by an air cylinder 75, and the cutter plunges onto a sealing mount 45 affixed to the surface plate 40. As a result thereof, the cutting edge 80 and sealing mark 81 of a packaged body 30 can be aesthetically formed by being moved closer to the front end of the packaged matter 18 as in FIG. 8.

Figure 9:
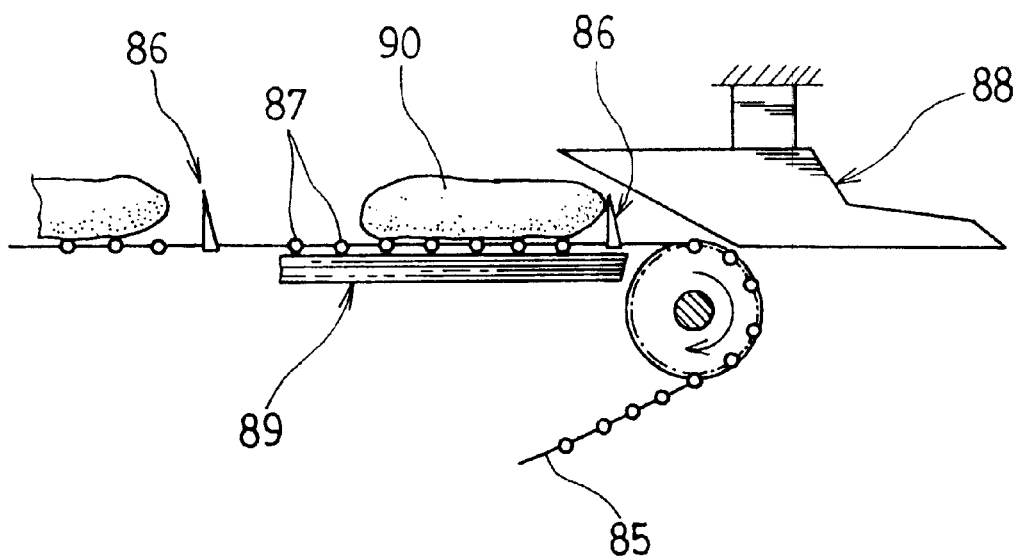
FIG. 9 is a diagram illustrating another embodiment.
Figure 10:
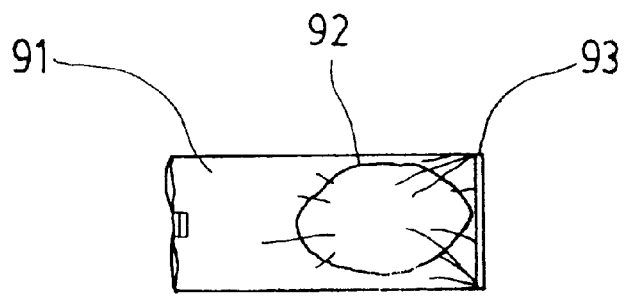
FIG. 10 is an illustration of a bag-forming state.

As shown in FIG. 9, a plurality of rollers 87 are supported in a freely rotating condition between each attachment 86 disposed on an endless chain 85, and, in addition, when the above-mentioned rollers 87 make contact with a rail 89 at the entry point of bag-forming means 88, and each roller is made to rotate on its own by friction, a packaged matter 90 is carried inside a film tube in a state in which the front end of the packaged matter 90 is being pushed against the attachment 86, and the front end of a packaged matter 92 inside a packaged body 91 can be positioned close to a sealing mark 93 as in FIG. 10. Therefore, in this embodiment, in contrast to the heretofore embodiment, the back end of the packaged matter 92 is detected by a sensor, and, in addition, by controlling the speed of the adjustable conveyor, the above-mentioned back end can be controlled so as to be congruous to the sealing mount on the surface plate.

What is claimed is:

1. A method for severing a bag mouth of a packaged body, comprising the steps of:

in a device for producing a pull-out tube by passing a belt-shaped film (12) through tube-forming means (13), while touching a packaged matter (18) with each attachment (15) mounted at equal intervals on a feed conveyor (16) and pushing the packaged matter inside a film tube (14), and sealing and cutting said film tube (14) along a back-end reference line of each packaged matter (18) in a direction of travel of said film tube (14) to form a packaged body (30), and thereafter, carrying each packaged body (30) onto a surface plate (40) having a sealing mount (45), said surface plate (40) moving at equal intervals and comprising a part of a vacuum chamber (148), mechanically detecting as a numeric value a displacement between (a) a front end of the packaged matter (18) in the packaged body (30) being conveyed by an adjustable conveyer (35), and (b) the surface plate (40) moving in the same direction as the packaged body; and correcting said displacement numeric value to zero by changing speed of the adjustable conveyor (35) and positioning the front end of the packaged body (30) along a sealing mount (45) on a surface plate (40), then severing the bag mouth of the packaged body (30) with a cutter (70) positioned along said sealing mount (45).

2. A method for severing a bag mouth of a packaged body, comprising the steps of:

in a device for producing a pull-out tube by passing a belt-shaped film (12) through tube-forming means (13), while pushing a front end of a packaged matter (18) against each attachment (15) mounted at equal intervals on a feed conveyor (16) and moving in the same direction as a film tube (14), and sealing and cutting said film tube (14) along a front-end reference line of each packaged matter (18) in a direction of travel of said film tube (14) to form a packaged body (30), and thereafter, carrying each packaged body (30) onto a surface plate (40) having a sealing mount (45), said surface plate (40) moving at equal intervals and composing a part of a vacuum chamber (148), mechanically detecting as a numeric value a displacement between (a) a back end of the packaged matter (18) in the packaged body (30) being conveyed by an adjustable conveyer (35) and (b) the surface plate (40) moving in the same direction as the packaged body; and correcting said displacement numeric value to zero by changing speed of the adjustable conveyor (35) and positioning the back end of the packaged body (30) along a sealing mount (45) on a surface plate (40), then severing the bag mouth of the packaged body (30) with a cutter (70) positioned along said sealing mount (45).

3. A device for producing a pull-out tube by passing a belt-shaped film (12) through tube-forming means (13), while touching a packaged matter (18) with each attachment (15) mounted at equal intervals on a feed conveyor (16) and pushing the packaged matter inside a film tube (14), and sealing and cutting said film tube (14) along a back-end reference line of each packaged matter (18) in a direction of travel of said film tube (14) to form a packaged body (30), and thereafter, carrying each packaged body (30) onto a surface plate (40) having a scaling mount (45), said surface plate (40) moving at equal intervals and comprising a part of a vacuum chamber (148), said device comprising:

an adjustable conveyor (35) installed in front of a movement area of said surface plate;

first detection means (59) for detecting a front end traveling pitch of each said packaged matter (18) indicative of the position of the front end of each said packaged matter, and second detection means (56) for detecting a traveling pitch of each said surface plate indicative of the position of each said surface plate;

a device (61) for detecting a displacement of a packaged matter front end relative to each said surface plate pitch by way of comparison between the detected values of said first and second detection means;

means (63, 65) for controlling speed of said adjustable conveyor (35) according to a signal (64) output from said displacement detecting device (61) such that the front end of said packaged body (30) is positioned along said sealing mount (45) on said surface plate (40); and a cutter (70) installed inside the vacuum chamber (148) so as to sever a bag mouth of the packaged body (30) along said sealing mount (45).

4. A device for producing a pull-out tube by passing a belt-shaped film (12) through tube-forming means (13), while touching a packaged matter (18) with each attachment (15) mounted at equal intervals on a feed conveyor (16) and pushing the packaged matter inside a film tube (14), and sealing and cutting said film tube (14) along a front-end reference line of each packaged matter (18) in a direction of travel of said film tube (14) to form a packaged body (30), and thereafter, carrying each packaged body (30) onto a surface plate (40) having a sealing mount (45), said surface plate (40) moving at equal intervals and comprising a part of a vacuum chamber (148), said device comprising:

an adjustable conveyor (35) installed in front of a movement area of said surface plate;

first detection means (59) for detecting a back end traveling pitch of each said packaged matter (18) indicative of the position of the back end of each said packaged matter, and second detection means (56) for detecting a traveling pitch of each said surface plate indicative of the position of each said surface plate;

a device (61) for detecting a displacement of a packaged matter back end relative to each said surface plate pitch by way of comparison between the detected values of said first and second detection means;

means (63, 65) for controlling speed of said adjustable conveyor (35) according to a signal (64) output from said displacement detecting device (61) such that the back end of said packaged body (30) is positioned along said sealing mount (45) on said surface plate (40); and a cutter (70) installed inside the vacuum chamber (148) so as to sever a bag mouth of the packaged body (30) along said sealing mount (45).

* * * * *